(No Model.)

J. T. HENRY.
PRUNING SHEARS.

No. 371,756. Patented Oct. 18, 1887.

Witnesses,
J. H. Shumway
Fred C. Earle

John T. Henry
By Atty Inventor
Wm O. Earle

UNITED STATES PATENT OFFICE.

JOHN T. HENRY, OF HAMDEN, CONNECTICUT.

PRUNING-SHEARS.

SPECIFICATION forming part of Letters Patent No. 371,756, dated October 18, 1887.

Application filed July 18, 1887. Serial No. 244,594. (No model.)

*To all whom it may concern:*

Be it known that I, JOHN T. HENRY, of Hamden, in the county of New Haven and State of Connecticut, have invented a new Improvement in Pruning-Shears; and I do hereby declare the following, when taken in connection with accompanying drawings and the letters of reference marked thereon, to be a full, clear, and exact description of the same, and which said drawings constitute part of this specification, and represent, in—

Figure 1:
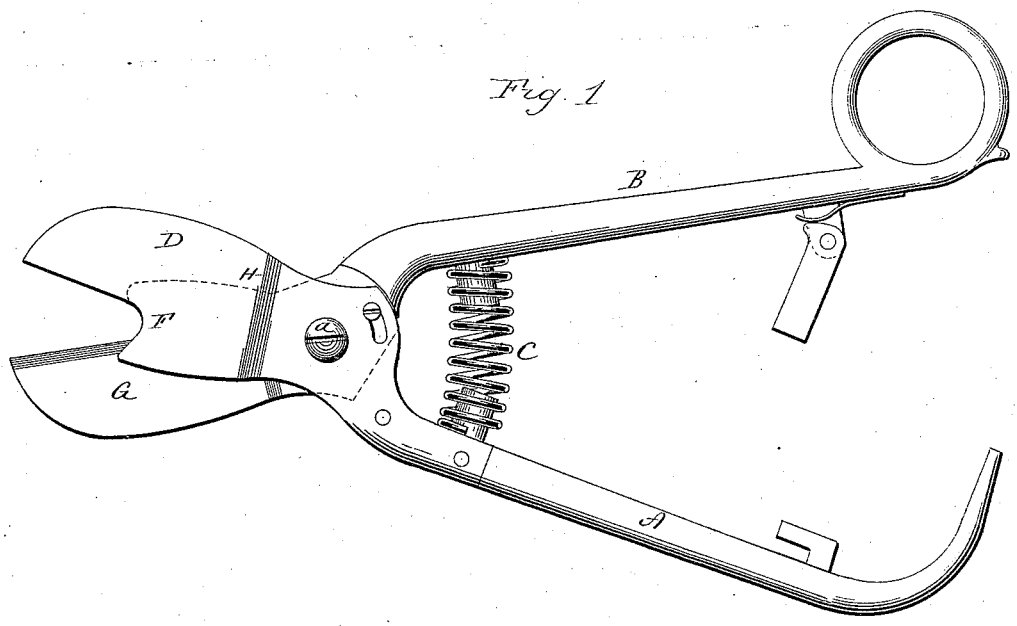
Figure 2:
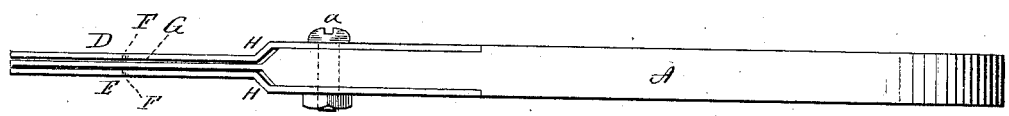
Figure 3:
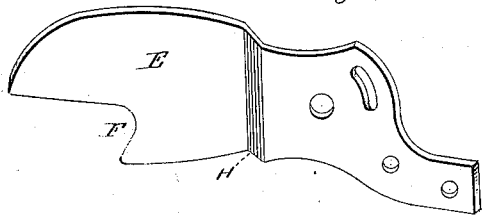

Figure 1, a side view; Fig. 2, an edge view, looking toward the handle A; Fig. 3, one of the blades of the handle A detached.

This invention relates to an improvement in that class of pruning-shears which are specially adapted for picking oranges.

Ordinary pruning-shears, and which are largely used for picking oranges, have their blades so thick that they are liable to come in contact with the surface of the orange. Such contact unavoidably bruises the surface of the orange to a greater or less extent, causing an early decay. In some cases the blades have been reduced in thickness; but with such shears the thicker portion toward the handles is liable to come into contact with the orange with the same result.

The object of my invention is the construction of a pair of shears whereby contact with the orange may be readily avoided; and it consists in a pair of handles hung upon a pivot, and so as to be grasped by the hand in the ordinary manner for pruning-shears, one of said handles having a pair of thin parallel blades extending therefrom, and the other with a single thin blade extending therefrom parallel to the two blades of the other handle, and so as to work between the said two blades, the said blades constructed with a stop midway of their length, to prevent the blades from passing so far onto the stem as to permit the thicker portion of the shears to come into contact with the fruit.

A represents one handle, and B the other handle, pivoted together at *a* in the usual manner, and provided with the usual spring, C, tending to force the handles apart, the handles themselves being adapted to be grasped by the hand also in the usual manner.

From the hub of the handle A two blades, D E, extend forward parallel with each other. These blades are best made from thin sheet-steel, as seen in Fig. 3, riveted upon opposite sides of the hub, as shown; but beyond the hub of the handle the blades are drawn together parallel with each other, and so as to leave a narrow space between them, as seen in Fig. 2. These blades are also constructed with a shoulder, F, upon their inner edge, about midway of their length or forward of the hub of the shears. The other handle, B, is constructed with a blade, G, preferably of thin sheet-steel, projecting from its hub in like manner as do the blades D E, but in a plane between the two blades D E, as seen in Fig. 2, the space between the two blades D E corresponding substantially to the thickness of the blade G, but so that the blade G may work freely between them, the three blades all being in parallel planes.

The two blades D E are turned inward toward each other to form the shoulder H at the hub; but the shoulder F is far forward of the shoulder H, as seen in Figs. 1 and 2. The shoulder F extends across the opening between the two blades D E and the blade G, as seen in Fig. 1, to form a stop which prevents the blades from being passed onto the stem beyond that point—that is, in passing the blades onto the stem they will be arrested so soon as the stop F reaches the stem. This will occur before the shoulder H can under ordinary usage reach the surface of the fruit, and because of preventing the shears from coming in contact with the fruit the injury almost unavoidable in the use of the common construction of shears is by this construction avoided. Again, by the combination of two blades of one handle with the blade of the other handle working between them, the two blades may serve as a rest, while the single blade, being ground to a sharp edge, more readily cuts the stem than with the two blades of a common pair of shears.

While specially adapted for picking oranges, these shears are well adapted for use as pruning-shears, because of the knife-like edge which is permissible, and the stop which prevents the blades from passing onto the stem beyond a predetermined and practical point.

I claim—

The herein-described shears consisting of two handles, A B, pivoted together, one of said handles constructed with a pair of thin blades extending from its hub parallel with each other, and so as to form a thin space between them, the other handle constructed with a thin blade extending from its hub parallel with the said two blades of the other handle and in a plane between the said two blades, the said blades constructed with a shoulder, F, on the cutting-edge between the hub and the end of the blades, the said shoulder of the blade of one handle overlapping the blade on the other handle, and so as to form a stop between the blades, substantially as described.

JOHN T. HENRY.

Witnesses:
 JOHN E. EARLE,
 FRED C. EARLE.